United States Patent [19]

Alexander et al.

[11] 4,122,063
[45] Oct. 24, 1978

[54] TREATING POLYETHYLENE TEREPHTHALATE WITH 1,2-EPOXY-3-PHENOXY PROPANE AND TRIPHENYLPHOSPHITE

[75] Inventors: William Alexander, Kingston, Canada; Alfredo Guillermo Causa, Akron, Ohio; James Girvan Fraser, Kingston, Canada

[73] Assignee: Millhaven Fibres, Ltd., Canada

[21] Appl. No.: 86,300

[22] Filed: Nov. 2, 1970

Related U.S. Application Data

[62] Division of Ser. No. 592,967, Nov. 9, 1966, Pat. No. 4,016,142.

[30] Foreign Application Priority Data

Nov. 29, 1965 [GB] United Kingdom ............... 50540/65

[51] Int. Cl.² ............................................. C08G 63/46
[52] U.S. Cl. ............................. 260/45.7 PH; 260/861; 260/865; 528/273
[58] Field of Search ..................... 260/75 T, 45.7 PH

[56] References Cited

U.S. PATENT DOCUMENTS

| 2,437,046 | 3/1948 | Rothrock et al. | 260/45.7 PH |
|---|---|---|---|
| 2,437,232 | 3/1948 | Rothrock et al. | 260/45.7 PH |
| 2,863,855 | 12/1958 | Wilson et al. | 260/75 T |
| 2,998,408 | 8/1961 | Zoetbrood | 260/47 C |
| 3,051,212 | 8/1962 | Daniels | 152/330 |
| 3,110,547 | 11/1963 | Emmert | 260/75 M |
| 3,275,606 | 9/1966 | Kujawa et al. | 260/75 UA |
| 3,372,143 | 3/1968 | Terada et al. | 260/47 C |
| 3,446,763 | 5/1969 | Okuzumi | 260/45.7 PH |
| 3,869,427 | 3/1975 | Meschke et al. | 260/75 T |

FOREIGN PATENT DOCUMENTS

1,034,854  7/1958  Fed. Rep. of Germany.
1,091,747  10/1960  Fed. Rep. of Germany.

*Primary Examiner*—Harold D. Anderson
*Attorney, Agent, or Firm*—Herbert M. Adrian, Jr.

[57] ABSTRACT

According to a preferred embodiment, polyethylene terephthalate polymer is prepared by a process including addition to the melt of 0.45 up to 0.9% by weight of 1,2-epoxy-3-phenoxypropane, and triphenylphosphite, as a stabilizer.

1 Claim, No Drawings

TREATING POLYETHYLENE TEREPHTHALATE WITH 1,2-EPOXY-3-PHENOXYPROPANE AND TRIPHENYLPHOSPHITE

This application is a division of invention(s) disclosed in copending and commonly assigned Appln. Ser. No. 592,967, filed Nov. 9, 1966, now U.S. Pat. 4,016,142, of the same inventors.

This invention relates to synthetic linear polyester filaments, yarns and cords useful as industrial fibres which show improved strength retention when exposed to hydrolytic conditions or when sealed in rubber and exposed to elevated temperatures. More particularly the invention relates to a process whereby the free carboxyl end group concentration of synthetic linear polyesters may be reduced to a low level.

It has been disclosed, for example, by W. W. Daniels in Canadian Pat. No. 697,467 that when rubber articles such as tires, belting and the like, are reinforced with cords comprising synthetic linear polyester, the cords show superior strength retention when the rubber articles are exposed to high operating temperatures if the free carboxyl end group concentration of the polyester comprising the cords is reduced to less than 15 equivalents per million grams. It has now also been observed that there is a correlation between the resistance of linear polyesters of a given carboxyl end group concentration to high running temperatures in rubber and their resistance to hydrolytic conditions, such as are encountered within hot rubber structures.

Whereas the usual commercial synthetic polyester fabrics having a free carboxyl group concentration of from about 30 to about 60 or more equivalents per million grams show a reasonably high degree of strength retention as rubber reinforcing elements, when such fabric/rubber structures are exposed to high operating temperatures under hydrolytic conditions, an excessive loss of strength is observed in the fabric. This strength loss is particularly evident with filaments used as reinforcing cords or fabrics in pneumatic tires, which tires operate at high temperatures, that is, at high speeds and under heavy loads. Surprisingly, however, when synthetic linear polyester filaments or cords having a free carboxyl end group concentration of 20 or 15 or fewer equivalents per million grams are employed as reinforcing elements in rubber articles exposed to high temperature and hydrolytic conditions, a substantial reduction in strength loss can be achieved.

It is the object of this invention to provide an improved process for controlling the concentration of free carboxyl end groups in synthetic linear polyesters.

A further object of this invention is to provide an improved process whereby the free carboxyl end groups in synthetic linear polyesters may be converted into esters containing active hydroxyl end groups capable of further reaction to produce higher molecular weight molecules.

A still further object of this invention is to provide a process whereby a modified synthetic condensation polyester polymer of higher molecular weight may be obtained than has heretofore been possible in a conventional polymerization process. Conversely, the process of this invention can produce polyester polymer at a given molecular weight in larger quantities than by conventional means.

Other objects of the invention will become apparent from a consideration of the following description and claims.

As used herein "synthetic linear polyesters" mean film-forming or fibre-forming condensation products of dicarboxylic acids such as terephthalic acid and glycols of the series $HO(CH_2)_n OH$ where $n$ is an integer from 2 to 10. The most important example of this class of polyesters is polyethene terephthalate which may be prepared by known processes such as are disclosed by Whinfield and Dickson in Canadian Pat. No. 490,196. For use as reinforcing elements in rubber structures, melt-spun filaments of polyethene terephthalate are drawn to about 3.5 to 7.0 times their length after melt spinning, twisted into yarns and plied into cords or woven into fabrics. The cords or fabrics are then treated with adhesive and bonded against or into the rubber structures.

Synthetic linear polyester yarns or cords made by known means can be shown to contain a free carboxyl end group concentration of from 30 to 60 or more equivalents per million grams. By "free carboxyl end groups" are meant the acid group —COOH, the concentration of which may be determined by Pohl's Method as described in Analytical Chemistry Vol. 26, page 1614, October 1954. The formation of such free carboxyl end groups results as a natural consequence of the processes normally employed in the production of linear polyester polymers.

Known synthetic linear polyester yarns or cords for use as rubber structure reinforcing elements are preferably made from a polymer having an intrinsic viscosity of from 0.75 to 1.0 or higher. Whereas synthetic linear polyester filaments used in textile products normally have an intrinsic viscosity of the polymer of from 0.35 to 0.66, these filaments are less suitable as rubber reinforcing elements since they are comparatively weak at a given extension level and fatigue to rupture with relatively little flexing. Filaments made from higher intrinsic viscosity synthetic linear polyester are stronger and less susceptible to such flex fatigue. It has been found, however, that in the production of a polymer of a high intrinsic viscosity by the normal method of extending the polymerization period, an increase in free carboxyl group concentration results. Thus, while a high intrinsic viscosity polymer may be produced to overcome the problem of filament strength and flex fatigue, at the same time the added carboxyl end group content results in an increase in the amount of strength lost when the filaments are exposed to high temperatures under hydrolytic conditions in rubber.

By "intrinsic viscosity" is mean the reduced viscosity of the polymer at zero concentration, which may be determined by measuring the flow times of a polymer solution after successive dilutions with fresh solvent, calculating the reduced viscosities, and extrapolating a plot of the reduced viscosities against concentration to zero concentration. The reduced viscosity is obtained from the expression:

$$\left( \frac{\text{Flow time of polymer solution}}{\text{Flow time of solvent}} - 1 \right) \times \frac{1}{c}$$

where $c$ is the concentration expressed as grams of polymer per 100 ml. of solvent. As used herein, the intrinsic viscosity was measured at 25° C., using orthochlorophenol as a solvent in a modified Ostwald viscometer.

The improved process of this invention whereby the number of free carboxyl end groups present in the polymer may be substantially reduced comprised adding to a synthetic polyester as hereinbefore defined, a substituted glycidyl ether which substituted glycidal ether reacts with the carboxyl end groups present in the polyester molecule to form esters containing free hydroxyl end groups. Such molecules may then react further to produce higher molecular weight molecules. The improved process of the invention, therefore, comprises the steps of reacting the reaction product of (A) polyesters formed by the reaction of at least one dicarboxylic acid and at least one glycol of the series HO(CH$_2$)$_n$OH wherein n is an integer from 2 to 10, such a polyester having in the molecule a terminal carboxyl group, and (B) a substituted glycidyl ether of the formula:

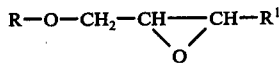

where R and R$^1$ are selected from the group consisting of hydrogen, aliphatic, cycloaliphatic or aromatic groups.

The reaction of (A) plus (B) and the resultant novel synthetic polyester reaction product formed thereby may be represented as follows:

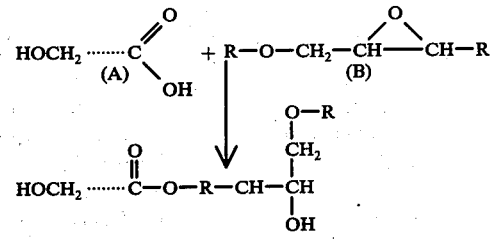

The resultant reaction product, therefore, comprises a modified polyethylene terephthalate molecule wherein a carboxyl end group has been converted into an ester containing a single free hydroxyl end group. Surprisingly, the esterified molecule then reacts further with other molecules to produce a polymer of higher molecular weight. In processes wherein the polymerization is carried on in a continuous manner, for example, by subjecting thin molten films or threadlines to polymerization conditions, the substituted glycidyl ether may be added to the unpolymerized or partly polymerized material.

By "substituted glycidyl ether" is meant any material represented by the formula:

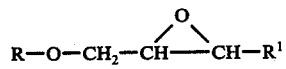

where R and R$^1$ may be hydrogen, aliphatic cycloaliphatic, or aromatic groups, for example,

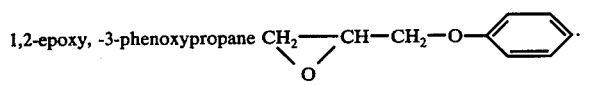

Such substituted glycidyl ethers may be saturated or unsaturated. Additional examples of useful substituted glycidyl ethers include among others, allyl glycidyl ether and 1-butoxy-2,3-epoxypropane.

It has been disclosed, for example, by C. L. Wilson et al in Canadian Pat. No. 607,174 that the free carboxyl group content of certain polyester resins useful as protective coatings or foamed products may be controlled by reacting with the carboxyl containing polyester resins an organic oxide such as ethylene oxide.

The process of Wilson et al is, however, directed to the manufacture of low viscosity, low molecular weight, mon-fibre-forming polyesters of substantially high acid number. Whereas an acid number of one is equivalent to 18 equivalents of carboxyl groups per million grams, it will be noted in the Wilson et al patent that the acid number of the polyesters obtained is generally greater than one. In addition, the low reaction temperature and long reaction time used with the organic oxides of Wilson et al are ineffective in reducing the carboxyl content of the high intrinsic viscosity polyester of the present invention. Prolonged reaction time would, in fact, increase the carboxyl content of higher molecular weight polyesters as is well known in the art. It will furthermore be understood that the use of substituted glycidyl ether is neither taught nor suggested in the disclosure of Wilson et al. There is likewise, no suggestion in the Wilson et al patent that the use of substituted glycidyl ether will increase productivity in the polycondensation of high molecular weight linear polyesters. The following examples illustrate the present invention but the latter is in no manner to be limited in scope to the embodiments described.

EXAMPLE 1

A quantity of a standard polyethylene terephthalate polymer was prepared according to the following procedure. 1550 g. of dimethyl terephthalate and 1100 ml. of ethylene glycol were placed in a distillation flask fitted with a reflux column. The mixture was heated to 160° C. and 0.015 per cent by weight of zinc acetate dihydrate was added as an ester interchange catalyst. The ester interchange reaction was continued until 640 ml. of methanol had been evolved and collected. 0.04 per cent by weight of antimony trioxide as polycondensation catalyst was added together with 0.5 per cent by weight of titanium dioxide as a delustrant and the batch was then transferred to an autoclave. The temperature of the batch was raised to 285° C. and the autoclave was simultaneously evacuated to a vacuum corresponding to 0.1 mm. of mercury. The polycondensation was allowed to continue until the electric power requirements of the stirrer motor indicated that a suitable molecular weight had been reached. 0.64 ml. of triphenyl phosphite was added to the batch as a stabilizer and the batch stirred under nitrogen gas at atmospheric pressure for 60 minutes. The batch was then extruded in ribbon form from the autoclave and the solidified polymer cut into cubes. Upon examination, the polymer was shown to have an intrinsic viscosity of 0.63, a softening point of 262.6° C. and a free carboxyl end group concentration of 32.6 equivalents per million grams of polymer.

EXAMPLE 2

A polymer batch was prepared under the conditions outlined in Example 1. At the end of the polymerization period 7.0 g. (0.45% w/w) of 1,2-epoxy-3-phenoxypropane was added to the melt and the melt stirred for ten minutes under dry nitrogen at atmospheric pressure. The autoclave was then evacuated to remove excess epoxide and the batch extruded in ribbon form. Examination of the polymer showed the intrinsic viscosity to be 0.668 and the free carboxyl end group concentration was 18.6 equiv./$10^6$g. of polymer.

EXAMPLE 3

A polymer batch was prepared under the conditions listed in Example 1. At the end of the polymerization period the autoclave was pressurized to 30 p.s.i.g. with dry nitrogen and 14.0 g. (0.90% w/w) 1,2-epoxy-3-phenoxypropane was added to the melt. After ten minutes stirring under pressure, the autoclave was evacuated to remove excess epoxide and the batch extruded in the form of a ribbon. Upon examination, the polymer was found to have an intrinsic viscosity of 0.671 and a free carboxyl end group concentration of 6.0 equiv./$10^6$g. of polymer.

The polymers from the above three examples were converted into 75 denier 33 filament yarns using techniques familiar to those skilled in the art. Tire cord samples were prepared by plying together 28 ends of each 75 denier 33 filament yarn. Six samples of each of these plied yarns were exposed to hydrolytic conditions in steam at 15 p.s.i.g. and 120° C. for 72 hours, and six samples were retained unexposed to the steam to determine the initial strength. After exposure, the strength loss of each sample was measured by means of an Instron tensile tester using a cross head speed of 20 cm./min., and a sample length of 20 cm. The following Table I summarizes the results obtained and it can be seen from the results that the percentage strength retention after exposure to hydrolytic conditions bears a direct relationship to the free carboxyl end group concentration of the polymer.

TABLE I

Percent Strength Retention of Polyethylene Terephthalate Yarns Exposed to Steam at 15 p.s.i.g., 120° C. for 72 hours

| Polymer Example | Polymer Carboxyl End Group Equiv./$10^6$g. | Yarn Carboxyl End Group Equiv./$10^6$g. | % Strength Retention |
|---|---|---|---|
| 1 | 32.6 | 36.7 | 62 |
| 2 | 18.6 | 25.3 | 72 |
| 3 | 6.0 | 13.0 | 83 |

EXAMPLE 4

A mixture consisting of 1300 lb. dimethyl terephthalate, 95 gallons ethylene glycol, 100 g. zinc acetate dihydrate, and 1.04 lb. antimony trioxide was placed in an autoclave fitted with a side arm condenser. The batch was heated to 160°C. at which point transesterification took place and methanol distilled off. The batch temperature was raised slowly to 190° C. at which point the theoretical quantity of methanol had been distilled off. The monomer/glycol solution obtained was transferred to a second autoclave and 5.0 lb. of titanium dioxide added as a slurry in glycol. The temperature of the batch was raised to allow excess glycol to distill off. The autoclave was then evacuated and the temperature raised to 285° C. The batch was held under vacuum until the power consumption to the stirrer indicated that an intrinsic viscosity of 0.75 had been reached. At this point, the vessel was blanketed with nitrogen, 500 ml. triphenyl phosphite stabilizer and 5.0 Kg. 1,2-epoxy-3-phenoxypropane added. The nitrogen presure inside the autoclave was raised to 15 p.s.i.g. and the batch stirred for 10 minutes. Vacuum was re-applied and maintained until the pressure inside the autoclave dropped to 0.2 mm. of mercury. The batch was then extruded. The resulting polymer was found to have an intrinsic viscosity of 0.809, and a softening point of 254° C. The carboxyl end group content was measured as 21 equiv./$10^6$ g.

This polymer was converted into an 1100 denier yarn using techniques familiar to those skilled in the art. This process increased the carboxyl end group content to 26 equiv./$10^6$ g. Three ends of this yarn were twisted individually to a twist level of 10 t.p.i. "Z," and the resulting yarns three piled to a twist level of 10 to t.p.i. "S." This is a common polyester tire cord construction. This cord was adhesive and heat treated in a manner commonly used to prepare polyester tire cords. The composition of the adhesive used is described by R. G. Aitken et al in Rubber World, February, 1965. A drying temperature of 200° F. was used to dry the adhesive, and subsequently the cord was heat treated at 475° C. The cord was held to length during this application. Treated cord samples for comparison were made up in an identical manner except that the polymer from which these cords were made was not modified by the addition of 1,2-epoxy-3-phenoxypropane to the polymer melt. The carboxyl end group content of this control yarn was determined as 53 equiv./$10^6$g.

Both treated cord samples were bonded into black rubber of a type which is used in the carcass of passenger car tires and the resulting vulcanized assemblies were held at 150° C. for 24 hours. The cords were subsequently removed and tested. It was found that the cord made from control polymer had lost 31.5% of its strength, compared with a 15.1% strength loss in the 1,2-epoxy-3-phenoxypropane treated sample.

EXAMPLE 5

A polymer batch was prepared as follows: 1550 g. of dimethyl terephthalate and 1100 ml. of ethylene glycol were placed in a distillation flask fitted with a reflux column. The mixture was heated to 160° C. and 0.015 per cent by weight zinc acetate dihydrate added as an ester interchange catalyst. The ester interchange reaction was continued until 640 ml. of methanol had been collected. 0.04 per cent by weight of the polymerization catalyst, antimony trioxide, was added together with 0.5 per cent by weight of titanium dioxide as a delustrant and then the batch was transferred to an autoclave. The batch temperature was raised to 285° C., and the autoclave simultaneously evacuated. The polycondensation was allowed to proceed until the power consumed by the stirrer indicated that a suitable molecular weight has been reached. The batch was then stirred under an atmosphere of nitrogen for 30 minutes. 0.64 ml. of triphenyl phosphite was added and the batch stirred for 2 minutes. 14 g. (0.9% w/w) of 1-butoxy-2,3-epoxypropane were added to the melt and the autoclave pressurized to 30 p.s.i.g. of dry nitrogen. After 10 minutes stirring under pressure, the autoclave was evacuated to remove excess epoxide. The batch was polymerized further until the power consumed by the stirrer indicated that the final desired molecular weight had been reached. Upon examination, the polymer was found to have an intrinsic viscosity of 0.72, a free carboxyl end group content of 12.8 equiv./$10^6$ g. of polymer and a softening point of 257.9° C. A repeat of the polymerization described above with no epoxide added, yielded polymer with an intrnsic viscosity of 0.730; softening point of 259.8° C. and a carboxyl end group content of 31.6 equiv./$10^6$ g. polymer.

EXAMPLE 6

A polymer batch was prepared under the conditions outlined in Example 5. Near the end of the polymerization period the autoclave was pressurized to 30 p.s.i.g. with dry nitrogen and 14 g. (0.9%) of allyl glycidyle ether

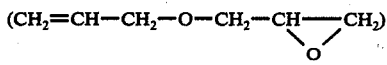

was added to the melt. Aften 10 minutes stirring under pressure, the autoclave was evacuated to remove excess epoxide and the batch was extruded in the form of a ribbon. Upon examination, the polymer was found to have an intrinsic viscosity of 0.713, a free carboxyl end group content of 14.7 equiv./$10^6$ g. and a softening point of 259.4° C. A repeat of the polymerization described above in which no epoxide was added, yielded polymer with an intrinsic viscosity of 0.730; softening point of 259.8° C. and a carboxyl end group content of 31.6 equiv./$10^6$ g. polymer.

EXAMPLE 7

A polymer batch was prepared under the conditions outlined in Example 5 except that the zinc acetate ester interchange catalyst used in Example 1 was replaced with 0.06 per cent by weight manganous acetate tetrahydrate and the triphenyl phosphite was replaced with 2.0 ml. tirbutyl phosphate. Upon examination, the polymer was found to have an intrinsic viscosity of 0.705, a carboxyl end group content of 31.5 equiv./$10^6$ g. polymer and a softening point of 260.1° C.

EXAMPLE 8

The preparation of the polymer in Example 7 was repeated. At the end of the polymerization period the autoclave was pressurized to 30 p.s.i.g. with dry nitrogen and 14 g. (0.9% w/w) 1,2-epoxy-3-phenoxypropane was added to the melt. After ten minutes stirring under pressure, the autoclave was evacuated to remove excess epoxide and the batch extruded as a ribbon. Upon examination the polymer was found to have an intrinsic viscosity of 0.690, a carboxyl end group content of 16.8 equiv./$10^6$ g. polymer and a softening point of 258.9° C.

EXAMPLE 9

A polymer batch was prepared under the conditions outlined in Example 5 except that the zinc acetate ester interchange catalyst used in Example 5 was replaced with 0.08 per cent by weight of cobaltous acetate tetrahydrate and the triphenyl phosphite was replaced with 3.4 ml. tributyl phosphate. Upon examination the polymer was found to have an intrinsic viscosity of 0.697, a carboxyl end group content of 48.4 equiv./$10^6$ g. and a softening point of 258.7° C.

EXAMPLE 10

The preparation of the polymer in Example 9 was repeated. At the end of the polymerization period the autoclave was pressurized to 30 p.s.i.g. with dry nitrogen and 14 g. (0.9% w/w) 1,2-epoxy-3-phenoxypropane added to the melt. After ten minutes stirring under pressure, the autoclave was evacuated to remove excess epoxide and the batch extruded as a ribbon. Upon examination the polymer was found to have an intrinsic viscosity of 0.680, a carboxyl end group content of 28.7 equiv./$10^6$ g. and a softening point of 256.7° C.

EXAMPLE 11

A control polymer batch was prepared as outlined in EXAMPLE 1. Upon examination the polymer was found to have an intrinsic viscosity of 0.714 and a carboxyl end group content of 34.5 equiv./$10^6$ g.

A second polymer was prepared under the same conditions except that 0.9% by weight of 1,2-epoxy-3-(-O-chloro-phenoxypropane) was added to the polymerized melt and stirred for ten minutes under dry nitrogen. An examination of the polymer obtained showed that the intrinsic viscosity was 0.710 and the carboxyl end group content was 24.9 equiv./$10^6$ g.

EXAMPLE 12

A polymer batch was prepared under the conditions outlined in Example 1 and at the end of the polymerization period 0.9% by weight of 3-chloro ethyl glycidyl ether was added to the melt and stirred for ten minutes under dry nitrogen. Upon examination the polymer was found to have an intrinsic viscosity of 0.719 and a carboxyl end group content of 18.6 equiv./$10^6$ g.

EXAMPLE 13

(a) 700 lbs molten dimethyl terephthalate and 46 gallons of ethylene glycol were mixed in a suitable ester-interchange vessel. 0.15% zinc acetate dehydrate was added to the mixture as a catalyst and the temperature raised from 150° C. to 225° C. at which point the evolution of methanol ceased and the theoretical quantity of methanol ahd been removed from the mixture via a distillation column. 0.08% antimony trioxide catalyst was added to the melt together with 0.5% titanium dioxide delustrant and the melt was transferred to an autoclave. Polymerization was carried out by increasing the autoclave temperature to 296° C. and lowering the pressure below 1 mm. mercury. The increase in molecular weight was observed by watching the increase in power required to agitate the polymer melt. When the power consumption reached 4 K.W. sufficient triphenyl phosphite stabilizer was added to give a phosphorus content of 100 p.p.m. Maximum molecular weight was achieved in 3 hours, 35 minutes at which point a plot of the power consumption of the agitator with time had leveled off at 11.7 K.W. At this point the polymer was extruded and diced. The polymer I.V. was determined in the manner described above and was found to be 0.864 with a carboxyl end group content of approximately 40 equiv./$10^6$ g. polymer. A repeat polymerization gave polymer with an intrinsic viscosity of 0.865and a carboxyl end group content of 41.0 equiv./$10^6$g. In this case the power consumption was 12.0 K.W. and the polymerization time 3 hours, 35 minutes.

(b) The same method was used to prepare additional polymer except that 150 p.p.m. sodium hydroxide was added at the beginning of ester-interchange 0.9% w/w phenyl glycidyl ether was added to the batch when the power consumption to the stirrer had reached 10.6 K.W. The phenyl glycidyl ether was stirred in after the addition of triphenyl phosphite. The stirring was continued for 10 minutes under 30 p.s.i.g. nitrogen. The batch was then re-evacuated and the polymerization continued until the maximum rated power consumption (18.3 K.W.) of the agitator motor was reached. At this point, there was no sign of any decrease in the rate of increase of agitator power consumption and therefore the maximum polymer molecular weight had not been reached. The polymer was extruded and diced. The polymer intrinsic viscosity was found to be 0.985 and the carboxyl end group content 27.6 equiv./$10^6$ g. A repeat polymerization yielded polymer with an intrinsic viscosity of 0.985 and a carboxyl end group content of 20.7 equiv./$10^6$ g. polymer.

It can be seen that under similar operating conditions a polyester of higher molecular weight as well as lower carboxyl end group content can be produced through the addition of a substituted glycidyl ether to the polymerization melt.

EXAMPLE 14

(a) A control polymer sample was prepared as outlined in Example 11 (a) except that the batch charge was increased from 700 dimethyl terephthalate to 1000 lbs dimethyl terephthalate and the glycol charge increased to 66 gal. The polymerization was carried out in the same manner and terminated when the agitator power consumption failed to increase further. This point represented the maximum intrinsic viscosity that could be attained at this batch size. In this instance the autoclave temperature reached 294° C., the stirrer power consumption was 12.4 K.W. and the batch polymerization time 4 hours, 10 minutes. The polymer intrinsic viscosity was 0.833. The experiment was repeated twice to yield polymers with a maximum intrinsic viscosity of 0.807 and 0.829 respectively.

(b) The same method was used to prepare polymer except that the batch size was increased to 1500 lbs and the glycol charge to 100 gal. 150 p.p.m. sodium hydroxide was added to the ester-interchange vessel before the ester-interchange reaction was started and 6.0 kg (0.9% w/w) phenyl glycidyl ether was added during the polymerization when the power to the agitator had reached 9.6 K.W. The phneyl glycidyl ether was stirred into the melt under a pressure of 30 p.s.i.g. nitrogen. The polymerization was stopped when the power consumption of the agitator reached 14.4 K.W. and the polymer was extruded and diced. Four such polymerizations were carried out, results being shown in Table II below:

TABLE II

| Batch No. | Intrinsic Viscosity | Carboxyl End Group Equiv./$10^6$ g. |
|---|---|---|
| 1 | .842 | 13.7 |
| 2 | .831 | 17.4 |
| 3 | .834 | 13.8 |
| 4 | .838 | 15.5 |

It can be seen that the addition of phenyl glycidyl ether during polymerization permitted a minimum increase of 50% in the batch size that could be prepared at a polymer intrinsic viscosity of 0.83.

What is claimed is:

1. In a process for the production of fiber forming polyethylene terephthalate comprising a polycondensation step, the improvement which comprises treating the polyethylene terephthalate melt during the polymerization after an intrinsic viscosity of 0.75 determined at 25° C in orthochlorophenol is attained with from about 0.45 up to about 0.9% by weight, based upon the polyethylene terephthalate melt, of 1,2-epoxy-3-phenoxypropane and from about 5 ppm up to about 1000 ppm, based upon the polyethylene terephthalate melt of triphenyl phosphite as a stabilizer.

* * * * *